Dec. 1, 1931. D. H. O'MEARA 1,834,415
EYESHADE
Filed June 14, 1928

Inventor
DENIS H. O'MEARA
By Harry H. Styll.
Attorney

Patented Dec. 1, 1931

1,834,415

UNITED STATES PATENT OFFICE

DENIS HENRY O'MEARA, OF DETROIT, MICHIGAN, ASSIGNOR TO AMERICAN OPTICAL COMPANY, OF SOUTHBRIDGE, MASSACHUSETTS, A VOLUNTARY ASSOCIATION OF MASSACHUSETTS

EYESHADE

Application filed June 14, 1928. Serial No. 285,320.

This invention relates to improvements in an attachment for an ophthalmic mounting and has particular reference to a visor member for the same.

The principal object of this invention is to provide a visor attachment for an ophthalmic mounting which is thin, light, flat, quickly detachable and small enough to be easily carried in the pocket when not in use.

Another object is to provide an inexpensively made article which will be efficient in use and cheap to buy.

Another object is to provide a transparent visor or shield which will have a filtering effect on bright light rays without entirely hiding said light from view.

Another object is to provide an inexpensive and convenient base for a useful article or tool such as a measuring scale, erasing shield, bookmark or an advertising novelty etc.

Other objects and advantages of the invention will become apparent from the following description taken in connection with the accompanying drawings, and it will be apparent that many changes may be made in the details of construction and arrangement of parts without departing from the spirit of the invention as expressed in the accompanying claims.

I, therefore, do not wish to be limited to the exact details of construction and arrangements herein shown and described, as the preferred forms only have been shown by way of illustration only.

It is generally conceded that upon certain occasions it is necessary to protect the eyes from the uncomfortable and injurious effects of a prolonged exposure to strong or glaring light. This is particularly the case with automobile drivers and the like who are subjected to the headlight glare of passing vehicles. Artists, readers, draftsmen and other workers who concentrate for long periods upon a light reflecting surface need a shield or visor to combat the direct light rays. A visor, however, has heretofore been a bulky and expensive article, so that for the wearer of lens I have invented a small inexpensive attachment which will give complete protection whilst having a number of other uses besides. A visor or shield which can be carried in as small a space as a vest pocket, and be quickly fitted in position is the prime object of my invention, and from the following description it will be seen that I have attained this object as well as others some of which have been referred to herein.

Figure 1:
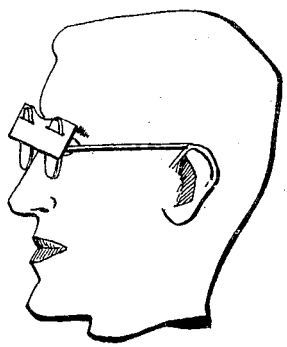
Fig. 1 is a perspective view of one model of the device in actual use.
Figure 2:
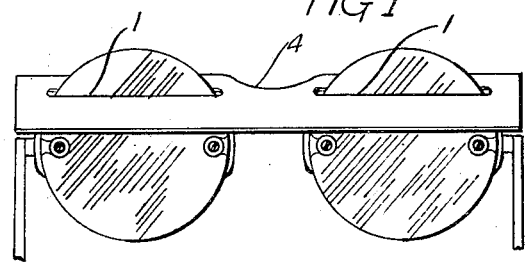
Fig. 2 is a front view of an ophthalmic mounting with one form of the device in position.
Figure 3:
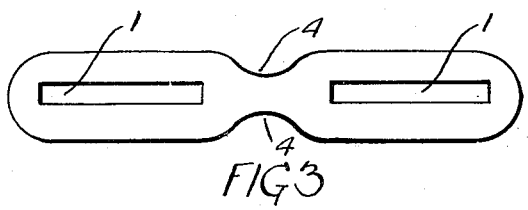
Figs. 3, 4, 5, 6, 7 and 8 are front views of various modifications or types of the device.

Referring to the drawings wherein similar reference characters denote corresponding parts throughout Figs. 1 and 2 show a thin elongated base member having the slots 1 cut therefrom through which the lenses of an ophthalmic mounting may be inserted and how this simple form of the visor or shield fits on any type of mounting having a small bridge piece. This type of visor can preferably be made of colored transparent material such as green or blue sheet celluloid. In this form the edge is cut back at 4 to clear the nose of the wearer. Fig. 3 shows a reversible type with the slots 1 being nearer one edge to give greater or less shades as desired. This is also preferably made of colored transparent material, and there is plenty of surface to form a good medium for advertising matter or for use as an erasing shield. Clearance for the forehead is shown by the edge cuts 4 which are located in each of the longitudinal edges.

Figure 4:
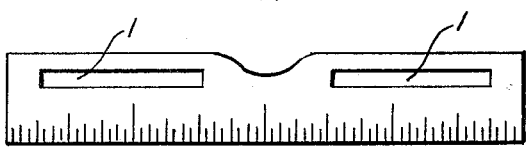

Fig. 4 is preferably made of polished ribbon steel and is engraved with a common measuring scale. The slots 1 can also be used for erasing purposes, making this a useful type for draftsmen, etc.

Figure 5:
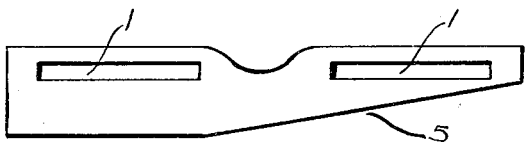

The type of visor or shield shown in Fig. 5 is particularly suitable for automobile drivers. Made preferably of transparent green celluloid and having a part of one of the longitudinal edges covering the right eye cut away on the inclined line 5. It leaves the left eye completely shaded from the glare of passing headlights as only a filtered stream of light can pass through. The right eye is left unobstructed for vision ahead.

Figure 6:
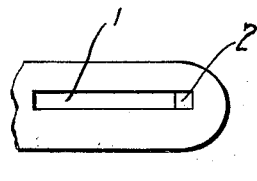

Fig. 6 shows part of the type adapted for book readers. The shield when no longer required as an eyeshade, can be used as a bookmark until next required. The tongue 2 projects from the terminal portion of the slot 1 and is offset to provide a lip to engage the page of the book etc. in the usual way.

Figure 7:
Figure 8:
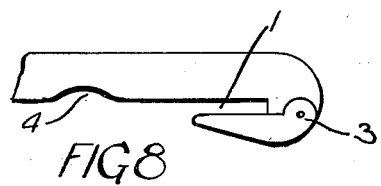

Fig. 7 shows part of a type that has been developed to clear bar or high bridges which stand rather higher than the ordinary rounded or low bridge. By cutting away the centre portion beyond the slots 1 on one side ample clearance is allowed, and this visor or shield can be used on any type of mounting. The same type is illustrated in Fig. 8 but has a hinged end-piece 3. These end-pieces 3 are stiff enough to stay firmly clasped round the lenses and can be adjusted for various thicknesses of lens.

From the foregoing it will be apparent that means for obtaining all of the various objects of the invention have been provided in a visor which can be cheaply manufactured and sold. When carried in the vest pocket or other convenient place it can be readily taken out and slipped over the lenses without removing them from the face.

Having described my invention, I claim:

1. A device of the character described, an eye shade of thin sheet material of oblong shape having longitudinal slots therein adapted to fit over the lenses of an ophthalmic mounting and having a space between them shaped on the longitudinal edge adjacent the wearer for forehead clearance and having a portion of the opposite longitudinal edge cut away at an angle tapering from one end to a point substantially midway between the ends.

2. A device of the character described comprising an eye shade of thin sheet like material the length and breadth of which is disposed in a single undeflected plane and having separated longitudinal openings entirely therethrough, the location, width and length of said openings being arranged to fit over a pair of spectacle lenses substantially as shown and described and said shade having its inner edge between the openings recessed and shaped for forehead clearance.

3. A device of the character described comprising an eye shade of thin sheet like material the length and breadth of which is disposed in a single undeflected plane and having separated longitudinal openings extending entirely therethrough, the location, width and length of said openings being arranged to fit over a pair of spectacle lenses substantially as shown and described and said shade having its inner edge between the openings recessed and shaped for forehead clearance, said openings being disposed nearer to one of the longitudinal edges of the sheet like member than to the other.

DENIS HENRY O'MEARA.